United States Patent [19]
Krakowski et al.

[11] 3,827,635
[45] Aug. 6, 1974

[54] AIR HOSE ADAPTER

[76] Inventors: Anthony J. Krakowski, 4026 East Pleasant Valley Rd., Seven Hills, Ohio 44131; Daniel S. Krakowski, 10178 Albion Rd., North Royalton, Ohio 44133

[22] Filed: Mar. 16, 1973

[21] Appl. No.: 341,884

[52] U.S. Cl................ 239/391, 137/223, 141/38, 239/525, 239/579
[51] Int. Cl.............................................. B05b 1/12
[58] Field of Search......... 239/392, 395, 397, 525, 239/577, 579, 393, 391; 152/415; 141/38, 304, 335, 344, 345; 137/223, 229

[56] References Cited
UNITED STATES PATENTS

| | | | |
|---|---|---|---|
| 2,482,922 | 9/1949 | Marcum | 137/223 |
| 2,579,408 | 12/1951 | Vreeland, Jr. | 239/579 X |
| 2,869,573 | 1/1959 | Stafford | 137/223 |
| 3,045,930 | 7/1962 | Rudd | 239/577 X |

*Primary Examiner*—M. Henson Wood, Jr.
*Assistant Examiner*—Michael Y. Mar

[57] ABSTRACT

There is disclosed herein an air hose adapter having an air tire chuck, an air blower nozzle movable into engagement with the chuck for blowing a stream of air, and a quick change coupling for attaching other air powered tools.

13 Claims, 5 Drawing Figures

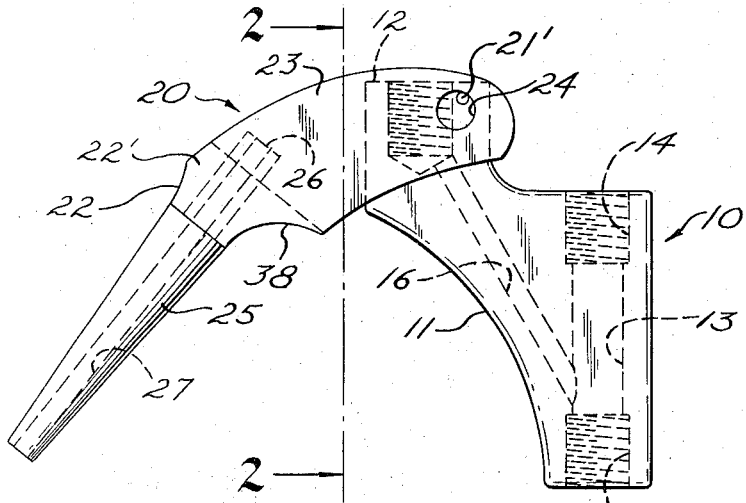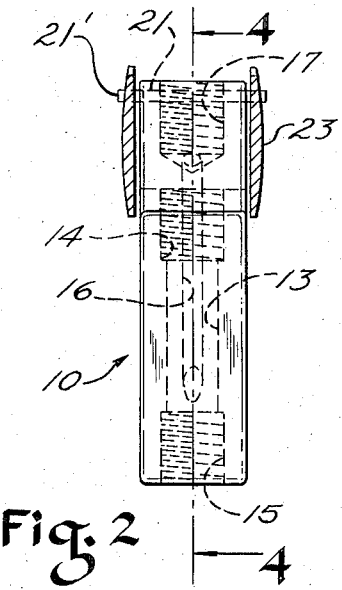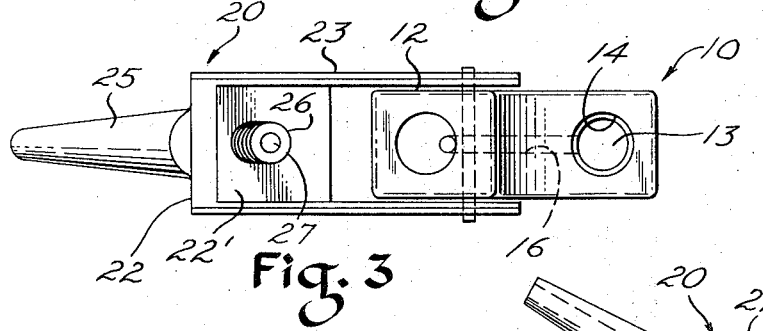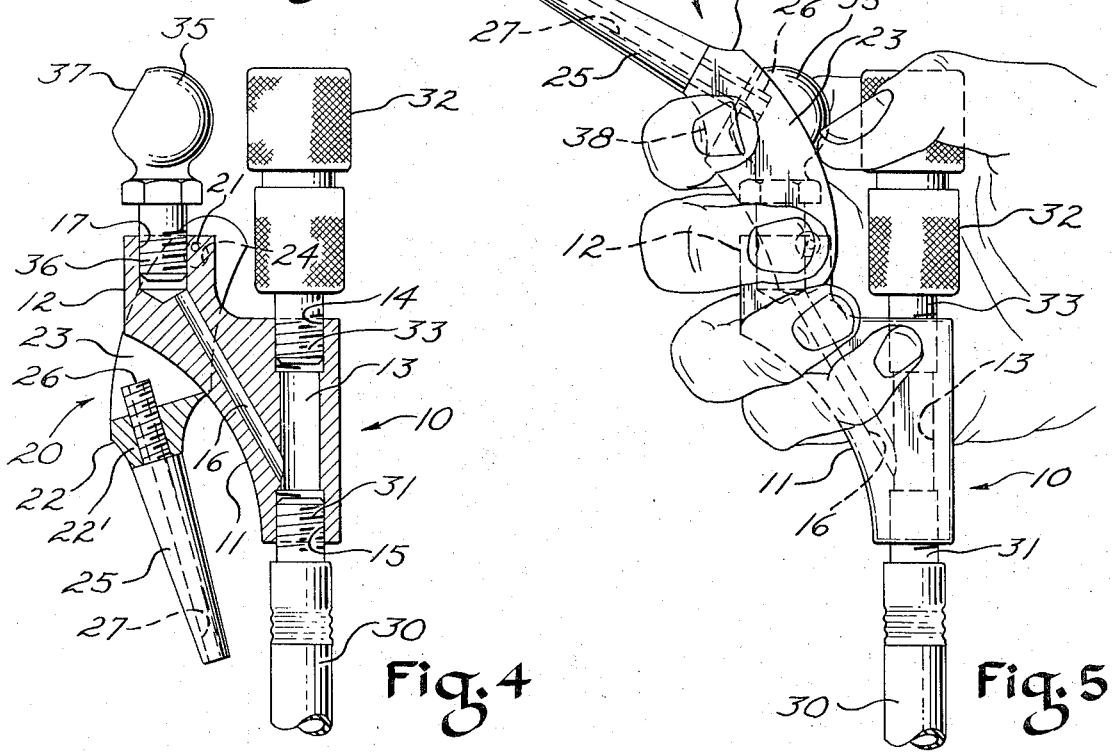

AIR HOSE ADAPTER

This invention relates to an air hose adapter for use in connection with a compressed air source in a garage for repairing automobiles. The invention particularly relates to an adapter which provides the garage mechanic with quick and easy access to a variety of compressed air operated tools.

In an auto repair garage, pressurized air, provided by means of an air compressor, is used for many purposes. The hose from the air source is commonly provided with a quick change coupling whereby a mechanical lug wrench, tire air chuck, air blower nozzle, or similar tool can be quickly coupled to the air pressure. Two of the most frequently used tools are the air blower nozzle and the tire air chuck. At the present time, all of the various tools including the air blower nozzle and tire air chuck are separately connected to the air hose as the need arises in the various repair operations. This means that a great deal of the mechanic's time is spent in locating the correct tool and in coupling and uncoupling the same. Thus, valuable time is lost, many tools are subject to being misplaced or damaged while lying on the garage floor, and both tools and coupling are subjected to excessive wear.

The present invention provides an air hose adapter which includes both an air blower nozzle and a tire air chuck which are instantly available for use without substantial manipulation of the coupling, and as herein disclosed, the adapter also provides a quick change coupling for connecting other tools to the air source without disturbing or disconnecting the air blower nozzle or the tire air chuck.

The general object of the invention is to provide an air hose adapter which will make the maximum number of air powered tools readily available to the mechanic with a minimum amount of time and manipulation on his part.

Another object of the invention is to provide an air hose adapter which in and of itself provides the mechanic with the two most frequently used air actuated tools without the removal of parts and with only a minimum of manipulation of the adapter.

Still another object of the invention is to provide an air hose adapter as set forth above having a quick change coupling adapted for connecting various other air powered tools to the compressed air source.

A further object of the invention is to provide an air hose adapter having the above features and characteristics whereby any select tool can be connected to the quick change coupling while the air blower nozzle and tire air chuck remain available for use.

Yet another object of the invention is to provide an air hose adapter including an air blower nozzle and an air tire chuck, the tools being so interrelated that the nozzle can be simply and easily maneuvered into contact with the chuck whereby to direct pressurized air through the nozzle.

Other objects of the invention and the invention itself will be readily understood from the following description of one embodiment thereof as shown in the accompanying drawings, in which said drawings:

FIG. 1 is a side elevation of a preferred form of the air hose adapter of this invention;

FIG. 2 is a vertical section taken along the line 2—2 of FIG. 1;

FIG. 3 is a top plan view of the air hose adapter;

FIG. 4 is a vertical section through the air hose adapter taken generally along the line 4—4 of FIG. 2 but showing the nozzle in the inoperative position and with the adapter having an air tire chuck, quick change coupling, and air hose connected thereto; and FIG. 5 is a side elevation of the air hose adapter completely assembled and in the position for use as an air blower nozzle.

Referring now to the drawings in all of which like parts are designated by like reference numerals, the air hose adapter of this invention comprises a pistol grip housing 10 having an upwardly and laterally projecting extension 11 surmounted by an upwardly and laterally offset socket 12. The housing 10 is provided with a vertical main air passage 13 which extends completely through the housing and is tapped at its upper and lower ends thereof adjacent to opposite surfaces of the housing as indicated at 14 and 15, respectively. An oblique bypass passage 16 extends through the lateral extension 11 from the main passage 13 to the socket 12, said socket being tapped as indicated at 17. Thus, the three tapped portions 14, 15, and 17 are all interconnected with each other by means of the air passages 13 and 16.

An air blower nozzle 20 is pivotally mounted to the housing 10 at the socket 12 by means of a transverse pin 21 which extends therethrough behind the tapped portion 17 (to the right of said tapped portion as seen in FIG. 1). Said air blower nozzle comprises a yoke 22 having a transverse, substantially thick wall 22' and a pair of parallel, rearwardly projecting arms 23. The rear end portions of said arms are provided with oversize apertures 24 through which outwardly projecting end portions 21' of the transverse pin 21 project. The apertures 24 are substantially larger than the end portions 21' thereby affording substantial floating movement to the air blower nozzle 20. Said air blower nozzle also includes a spout 25 having a diametrically reduced, externally threaded inner end portion 26 and a central bore 27. The inner end portion 26 is thread fitted through the wall 22' of the yoke 22 and projects inwardly between the arms 23 a substantial distance beyond said yoke wall.

Referring now particularly to FIGS. 4 and 5, the air hose adapter of this invention is adapted to receive an air hose 30 from a compressed air source, said air hose having an externally threaded fitting 31 adapted to be connected to the main passage 13 at the tapped portion 15. At the other end of the air passage 13 there is provided a conventional quick change coupling 32 having an externally threaded fitting 33 fitted into the tapped portion 14. A tire air chuck 35 is mounted to the air hose adapter by means of an externally threaded fitting 36 thread fitted into the tapped portion 17 of the socket 12.

The tire air chuck 35 is of the conventional, well-known type adapted to be placed over or against the annular end portion of a tire valve or the like whereby pressure against the tire valve opens the air chuck for filling the tire.

Referring particularly to FIG. 4, it will be noted that the mouth of the chuck 35, indicated at 37, which is adapted to engage a tire valve is angled forwardly and slightly upwardly and faces generally away from the quick change coupling 32. Thus the air blower nozzle 20 can be swung upwardly from the position of FIG. 4 to that shown in FIG. 5 whereby the inner end portion 26 of the spout 25 can engage the mouth 37 of the chuck 35. The loose or floating connection of the arms 23, due to the oversize apertures 24 and the end portions 21' of the pin 21, allow the blower nozzle 20 to move outwardly sufficiently whereby the inner end portion 26 can clear the edge of the air chuck and easily enter the mouth 37. In this position, the adapter, air blower nozzle, chuck, and quick change coupling can be readily grasped in the manner of a pistol with the index or trigger finger pulling rearwardly and slightly downwardly on the air blower nozzle to open the chuck 35 and send a blast of air through the central bore 27 of the spout 25. To facilitate this operation, it will be noted that the air blower nozzle 20 is provided with a rounded, concave undersurface 38 just below and adjacent to the rear of the spout 25, said undersurface 38 being formed in the wall 22' of the yoke 22.

When it is desired to use the tire air chuck 35 in the conventional manner for putting air into an automobile tire, the air blower nozzle 20 is swung downwardly to the position shown in FIG. 4 whereby said chuck is readily usable.

In both of the foregoing manipulations of the adapter, the quick change coupling 32 blocks the upper end of the passage 13, said coupling being of the well-known type which automatically closes when not attached to a tool to save pressure and reduce the work load to the compressor. Any of the other well-known tools such as a mechanical lug wrench (not herein illustrated) can be readily attached to the coupling 32 and used in the conventional manner as though said coupling were provided directly upon the end of the air hose 30. Because the tire air chuck 35 and the quick change coupling 32 and the peculiarities of their operation are old and well known in the art, no attempt is made to detail the internal working parts thereof.

From the foregoing, it will be readily understood that the air hose adapter of this invention provides means whereby two frequently used tools, the air blower nozzle and the tire air chuck, are incorporated with a conventional quick change coupling to make these two important tools available at all times to the mechanic without attaching anything to or removing anything from either the coupling or the adapter. The mechanic only needs to swing the air blower nozzle upwardly into engagement with the mouth 37 of the tire air chuck 35 and said combination immediately provides him with an efficient air blower tool. Other air powered tools can be readily attached in the conventional manner and without further modifications to the adapter by means of the quick change coupling 32, all the convenience of said quick change coupling being retained. The air blast nozzle and the tire air chuck are both compact and do not interfere in any way with the regular use of the coupling.

It will be understood that many changes in the details of the invention as herein described and illustrated may be made without, however, departing from the spirit thereof or the scope of the appended claims.

We claim:

1. An air hose adapter comprising a housing; said housing having a main through passage opening at different surface portions of said housing; means at one end of said main passage for connecting an air hose and at the other end of said main passage for connecting a quick change coupling for air-powered tools; said housing having socket means for connecting a tire air chuck spaced from said main passage; said housing having a bypass passage connecting said main passage with said socket means for supplying air to the air chuck; and an air blower nozzle having air chuck engaging means, said air blower nozzle being movably mounted on said housing for movement between an air chuck engaging position for directing air through said nozzle, and a position removed therefrom whereby an air chuck mounted in said socket means can be used to put air in a tire.

2. An air hose adapter comprising a housing; said housing having a main through passage opening at opposite surface portions of said housing; means at one end of said main passage for connecting an air hose and at the other end of said main passage for connecting a quick change coupling for air-powered tools; said housing having socket means disposed laterally of said main passage for connecting a tire air chuck thereto; said housing having a bypass passage connecting said main passage with said socket means for supplying air to an air chuck; an air blower nozzle having air chuck actuating means; and means movably mounting said air blower nozzle on said housing for movement between air chuck actuating position in which said actuating means can engage an air chuck whereby the air chuck can be opened to direct air through said nozzle, and a position removed therefrom whereby said air chuck can be used in a conventional manner to put air in a tire.

3. An air hose adapter as set forth in claim 2: said means mounting said air blower nozzle on said housing comprising pivot means for pivoting said air blower nozzle between said air chuck actuating position and said removed position, said pivot means providing a loose, floating connection allowing movement of said air blower nozzle to actuate an air chuck mounted in said socket means.

4. An air hose adapter comprising a housing; said housing having a socket for receiving a tire air chuck; said housing having means for connecting an air hose thereto separately from said air chuck; said housing having passage means connecting said socket with said means for connecting an air hose whereby air can be directed to the air chuck; an air blower nozzle having air chuck actuating means; and connector means connecting said air blower nozzle to said housing, said connector means providing movement of said nozzle between air chuck actuating position, in which said actuating means can engage an air chuck mounted in said socket and the air chuck can be opened to direct air through said nozzle, and a nonactuating position wherein the actuating means is displaced from the air chuck and the air chuck can be used in a conventional manner to put air in a tire while said air blower nozzle remains attached to said housing.

5. Air hose adapter means comprising a housing; an air hose connected to said housing; a tire air chuck mounted in said housing; said housing having passage means connecting said air hose with said chuck for delivering compressed air to said chuck; an air blower nozzle having air chuck actuating means; and connector means connecting said air blower nozzle to said housing, said connector means providing movement of said nozzle between air chuck actuating position in which said actuating means engages said air chuck to open said air chuck and direct air through said nozzle, and a nonactuating position wherein the actuating means is displaced from the air chuck and said air chuck can be used in a conventional manner to put air in a tire while said air blower nozzle remains attached to said housing.

6. Air hose adapter means comprising a housing; an air hose connected to said housing; a tire air chuck mounted in said housing; said housing having passage means connecting said air hose with said chuck for delivering compressed air to said chuck; an air blower nozzle having air chuck actuating means; and means movably mounting said air blower nozzle on said housing for movement between air chuck actuating position in which said actuating means engages said air chuck whereby said air chuck can be opened to direct air through said nozzle, and a position removed therefrom whereby said air chuck can be used in a conventional manner to put air in a tire; said means mounting said air blower nozzle on said housing comprising pivot means for pivoting said air blower nozzle between said air chuck actuating position and said removed position, said pivot means providing a loose, floating connection allowing movement of said air blower nozzle to actuate said air chuck.

7. An air hose adapter comprising a housing; said housing having a socket for receiving a tire air chuck and means for connecting an air hose thereto; said housing having passage means connecting said socket with said means for connecting an air hose whereby air can be directed to an air chuck carried in said socket; an air blower nozzle having a pair of parallel, laterally spaced rearwardly directed arms pivotally mounted on either side of said housing; said blower nozzle having an air chuck actuating portion projecting rearwardly between said arms, said air blower nozzle being pivotable between an operating position wherein said actuating portion engages an air chuck carried in said socket and a nonoperating position pivoted away from the air chuck whereby said air chuck can be used to put air in a tire; and said pivot means having a loose, floating pivotal connection with said housing allowing movement of said blower nozzle axially against an air chuck carried by said socket to open the chuck and direct a stream of air through said blower nozzle.

8. An air hose adapter as set forth in claim 7: said air blower nozzle having finger engaging means whereby when said housing is manually grasped, said engaging means is adapted to be engaged by a finger and pulled whereby said chuck actuating portion is pulled against an air chuck carried by said socket.

9. An air hose adapter as set forth in claim 8: said housing having means for connecting a quick change coupling for air-powered tools thereto; said housing having a passage in fluid communication with said last mentioned means, said passage means, and said means for connecting an air hose whereby said adapter may be optionally used in the operation of air-powered tools.

10. An air hose adapter as set forth in claim 8: said loose, floating pivotal connection comprising pin means projecting from opposite sides of said housing, said arms having apertures therein substantially larger than said pin means, and said pin means projecting through said apertures.

11. An air hose adapter comprising a housing; a tire air chuck mounted in said housing; said housing having means for connecting an air hose thereto separately from said air chuck; said housing having passage means connecting an air hose whereby air can be directed to said air chuck; an air blower nozzle having air chuck actuating means; and connector means connecting said air blower nozzle to said housing, said connector means providing movement of said nozzle between air chuck actuating position, in which said actuating means engages said air chuck whereby said air chuck can be opened to direct air through said nozzle, and a nonactuating position wherein the actuating means is displaced from the air chuck and said air chuck can be used in a conventional manner to put air in a tire while said air blower nozzle remains attached to said housing.

12. An air hose adapter comprising a housing; said housing having a main through passage opening at different surface portions of said housing; means at one end of said main passage for connecting an air hose and at the other end of said main passage for connecting a quick change coupling for air-powered tools; a tire air chuck mounted in said housing and spaced from said main passage; said housing having a bypass passage connecting said main passage with said air chuck; and an air blower nozzle having air chuck engaging means, said air blower nozzle being movably mounted on said housing for movement between an air chuck engaging position for directing air through said nozzle, and a position removed therefrom whereby an air chuck mounted in said socket means can be used to put air in a tire.

13. Air hose adapter means comprising a housing; an air hose connected to said housing; a tire air chuck mounted in said housing; said housing having passage means connecting said air hose with said chuck for delivering compressed air to said chuck; an air blower nozzle having air chuck actuating means; means movably mounting said air blower nozzle on said housing for movement between air chuck actuating position in which said actuating means engages said air chuck whereby said air chuck can be opened to direct air through said nozzle, and a position removed therefrom whereby said air chuck can be used in a conventional manner to put air in a tire; said means mounting said air blower nozzle on said housing comprising pivot means for pivoting said air blower nozzle between said air chuck actuating position and said removed position.

* * * * *